H. NEWBOLD.
EYEGLASSES.
APPLICATION FILED JULY 13, 1910.
1,176,920.
Patented Mar. 28, 1916.
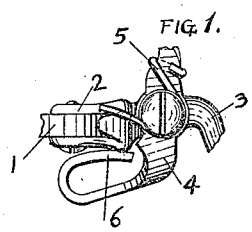
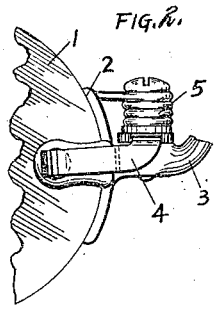
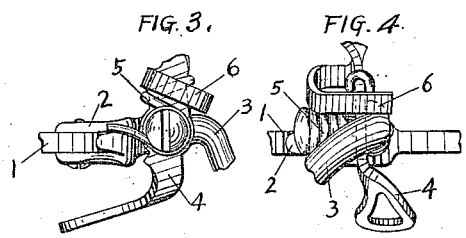
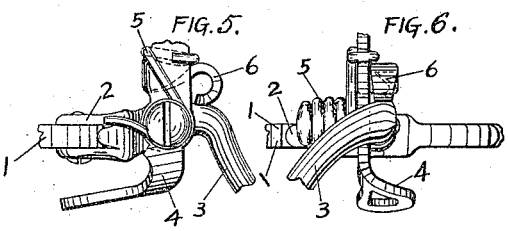
WITNESSES:
Joseph J. Demers
John J. Hogan Jr
INVENTOR
HARRY NEWBOLD
BY Harry H. Styles
ATTORNEY

UNITED STATES PATENT OFFICE.

HARRY NEWBOLD, OF LONDON, ENGLAND, ASSIGNOR TO AMERICAN OPTICAL COMPANY, OF SOUTHBRIDGE, MASSACHUSETTS, A CORPORATION OF MASSACHUSETTS.

EYEGLASSES.

1,176,920.  Specification of Letters Patent.  Patented Mar. 28, 1916.

Application filed July 13, 1910. Serial No. 571,824.

*To all whom it may concern:*

Be it known that I, HARRY NEWBOLD, a subject of the King of Great Britain, and resident of London, England, have invented certain new and useful Improvements in Eyeglasses, of which the following is a specification.

My invention relates to certain improvements in eyeglasses, and more particularly to that form of eyeglass in which there are employed spring actuated nose clamps or guards pivoted adjacent to the opposite ends of the bridge connecting the lenses of the eyeglass.

The object of my improvement is to provide means for limiting or restricting the travel of the nose clamps toward the nose of the wearer, so that the clamps may be adjusted to engage the nose with sufficient pressure to hold the eyeglasses in place without subjecting the nose to the usual unrestrained pressure of the actuating spring.

It has been found in the use of eyeglasses employing spring actuated nose clamps, that the constant unrestricted pressure of the spring will indent the flesh at the side of the nose and cause the wearer considerable discomfort and pain. My improvement is designed to relieve this constant pressure by limiting the travel of the clamp with respect to the nose. The clamp is permitted to engage sufficient of the flesh to support the eyeglasses in place but all further movement is restricted. Each of the limiting and restricting devices illustrated in the drawings interposes an adjustable stop in the path of the actuating lever, the stop co-acting between the actuating lever and the lens mounting or connecting structure.

Figures 1 and 2 show a plan view and a front elevation wherein the movement of the actuating lever is restricted and adjusted by bending back the outer end of the actuating lever so that it may abut the lens holding structure. Figs. 3 and 4 are a plan view and a side elevation wherein the movement of the actuating lever is restricted and adjusted by means of a loop of pliable material secured to the actuating lever in the rear of the pivot and abutting the structure connecting the two lenses, the loop extending across the top of the lever. Figs. 5 and 6 are a plan view and a side elevation showing a modification of the structure shown in Figs. 3 and 4, the loop of pliable material being on the under side of the actuating lever instead of on top.

Referring to the drawings, the lenses 1 are held in alinement in the usual manner by the clips 2 and the cross member or bridge 3. The clamp levers 4 are pivoted adjacent the opposite ends of the bridge 3 and actuated by springs 5 in the usual manner, the outer end of the levers 4 being bent around and adapted for use as handles or finger pieces for operating the levers. To limit the movement of the nose engaging ends of the clamp levers toward each other, an adjustable stop 6 is interposed between the movable lever 4 and the fixed structure holding the lenses in alinement. The stop may be secured to or engage the lever arm either in front of or to the rear of the pivotal point of the lever arm, and it is apparent that its operation is equally effective when secured to the lens attaching structure as when secured to the movable lever arm, the positions being interchangeable. It is also apparent that various forms of structure other than the metallic tongue can be employed to restrict the movement of the lever; therefore, I do not wish to be limited to the forms shown, the said forms having been selected for convenience of description in this specification.

The stops are adjusted as follows: The nose clamps are adjusted to the nose of the wearer in the usual manner. The handles or finger pieces of the levers 4 are next drawn slightly toward each other, so that the inward pressure of the actuating springs against the nose is relieved, but sufficient contact is left with the flesh of the nose to support and hold the eyeglasses in place. The stops 6 are then set so that they engage the lens attaching structure and the movement of the levers toward the nose limited and fixed. Adjustment of the tongue or loop is made by bending the tongue with pliers or other instruments until the required distance between the lever and lens attaching structure is assumed.

It will be seen that by the use of my invention the injurious and painful pressure of spring actuated nose clamps may be relieved, and the desired contact with the nose readily and quickly fixed or adjusted.

I am aware that previous to my invention the travel of the nose clamp levers has been limited to a fixed arc for convenience of manipulation, by means of a fixed contact point between the levers and the lens attaching structure, but I am not aware, and do not believe that adjustable stops interposed in the paths of the levers for the purpose of restricting and controlling the pressure of the clamps on the nose have ever been used prior to my invention and Therefore, what I claim as new and desire to secure by Letters Patent is:

1. In an eyeglass mounting, the combination with a support, of a lever pivoted thereon and having a handle at the forward portion thereof for actuating the same, and a guard on the rearward portion thereof, said lever having a finger disposed to one side thereof adjacent the guard and formed from pliable material, the said finger being reversely bent upon itself, and extending into engagement with the support, whereby twisting of the finger or bending of the loops therein serves to adjust the same to limit the inward movement of the nose bearing portion of the lever.

2. In eyeglasses, in combination, a support, a guard lever pivoted thereon, a pliable finger arranged on said lever for engagement with the support, said finger being bent upon itself whereby twisting or bending of the loop formed by the reverse bend of the finger serves to adjust the finger to vary the movement of the arm in one direction.

In testimony whereof, I affix my signature in the presence of two witnesses.

HARRY NEWBOLD.

Witnesses:
JAMES PRICE PETHERICK,
HARRY ARTHUR AYSON.

Copies of this patent may be obtained for five cents each, by addressing the "Commissioner of Patents. Washington, D. C."